United States Patent Office 3,385,440
Patented May 28, 1968

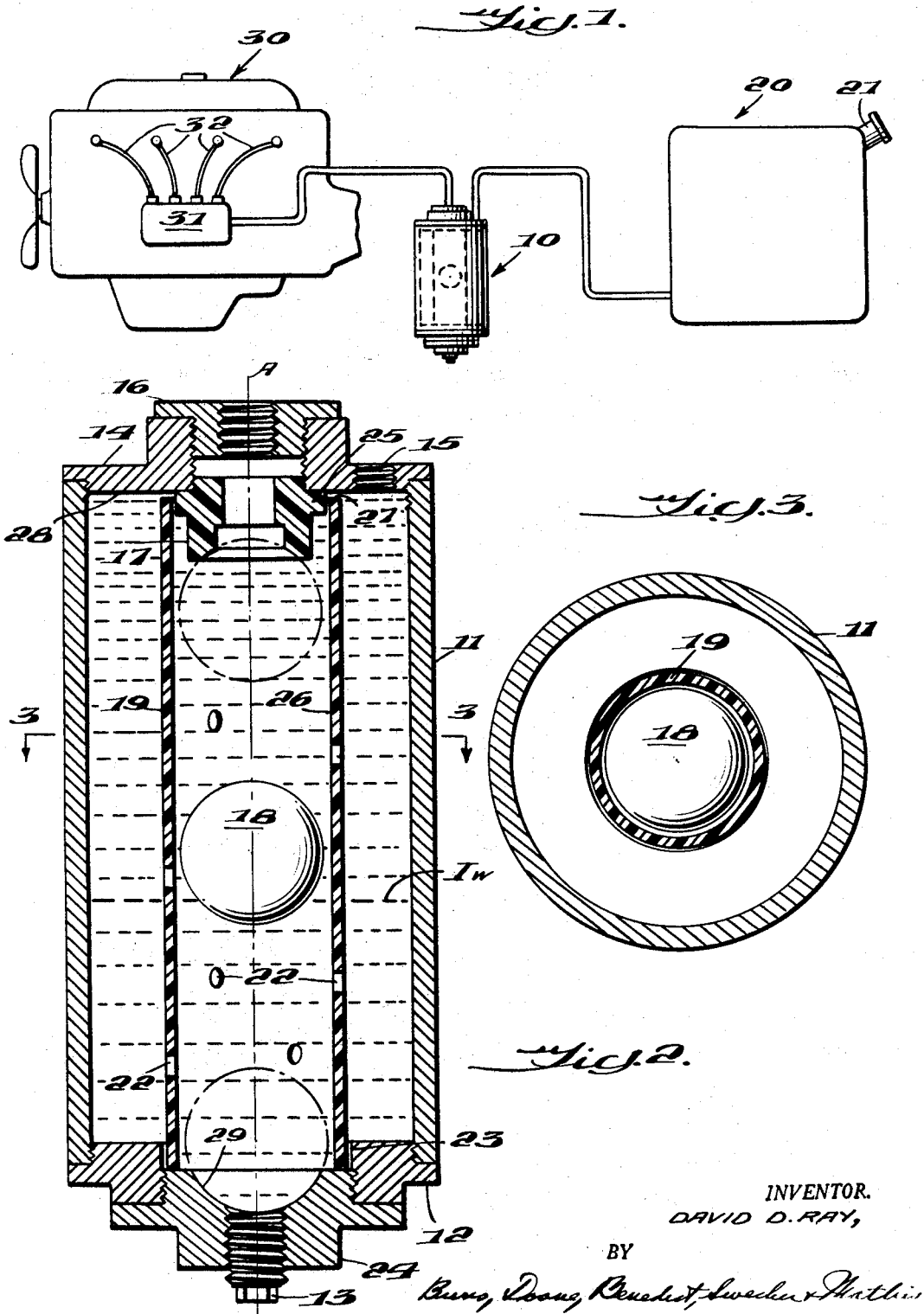

3,385,440
WATER SEPARATOR AND FUEL CUTOFF
David D. Ray, Plant City, Fla., assignor to H.D.R. Manufacturing Co., Inc., Lakeland, Fla., a corporation of Florida
Filed June 1, 1966, Ser. No. 554,485
3 Claims. (Cl. 210—109)

ABSTRACT OF THE DISCLOSURE

An apparatus for separating a liquid of a lighter specific gravity from a liquid of a heavier specific gravity in an immiscible mixture of such liquids. The apparatus includes a body having a chamber into which the mixed fluids are conducted through an inlet port to separate into lighter and heavier layers. A spherical float disposed in the chamber has a specific gravity intermediate that of the two liquids to float on the interface between the layers. The float rises in the chamber as the level of heavier liquid rises and is guided into blocking contact with an outlet port by a guide tube within the chamber, to prevent the heavier liquid passing through the outlet port. The inlet and outlet ports are on opposite sides of the guide tube which has an impervious cylindrical wall having a plurality of spaced openings therein.

---

This invention relates to water separators for fuel systems and more particularly, to an apparatus for cutting off the supply of fuel to an engine before the water can enter the engine.

Fuel in the fuel systems of gasoline and diesel engines is generally contaminated with water due to the accumulation of water in the fuel tank. This accumulation results mostly from the condensation of water caused by variations in temperature and atmospheric conditions, often from water entering through the filler neck of the tank, and in some instances, from water that is already present in the fuel before it is put into the tank.

Whatever the reason or reasons for the water being present in the fuel tank or anywhere in the fuel system, it is imperative that this water be prevented from entering the engine before it damages its internal parts. For example, water causes pitting of piston heads and combustion chambers. In diesel engines, water can cause burning of the tips of the fuel injection nozzles. Also, water in the fuel is often responsible for hard starting and rough running.

Others have proposed devices for separating the water from water laden fuel in a tank or chamber and for shutting off the flow of fuel before the water is discharged from the tank along with the fuel. One example is disclosed in the patent to Ryan et al. No. 2,204,998, wherein they show a water eliminator that includes a casing, a float with a specific gravity intermediate gasoline and water, a valve for closing the fuel outlet, and a lever linkage arrangement connected between the float and the valve for transmitting the motion of the float to the valve, such that when the water reaches a predetermined level the valve shuts off the flow of fuel out of the casing.

Although the Ryan et al. water eliminator has served the purpose, it has not proved to be entirely satisfactory under all conditions, especially when installed on a motor vehicle, for the reason that the magnifying effect of the lever linkage tends to make the device too sensitive to road shock.

An object of the instant invention is the provision of a gravity type separator for liquids with a minimum of moving parts for cutting off the flow of a lighter liquid from the separator.

Another object of the present invention is to provide a water separator and fuel cutoff that is adaptable for use on a motor vehicle and which is relatively insensitive to road shock.

A further object of the present invention is to provide an apparatus for separating water from contaminated fuel by gravity and for shutting off the flow of fuel from the apparatus by means of a direct acting valve member.

Still another object of the present invention is the provision of an apparatus for separating water from contaminated fuel in a vehicle engine fuel system and for automatically shutting off the supply of uncontaminated fuel to the engine before the water can enter the engine and damage its internal parts.

Yet another object of the invention is to provide a water separator and automatic fuel cutoff device adaptable for use on a motor vehicle that is economical to manufacture, easy to maintain and reliable in its operation.

According to the present invention, the foregoing and other objects are attained by providing within a chamber into which fuel contaminated with water enters and wherein the water and the fuel separate due to the differences in their specific gravities, a ball float valve that is designed to float in water but not in fuel, a guide for the ball, and a ball seat at the fuel outlet. As long as the level of the water stays below a predetermined level, only uncontaminated fuel will leave the chamber through the outlet. However, when the water level rises sufficiently to force the ball against the seat, all flow out of the chamber ceases. When this device is installed in an internal combustion engine fuel system, the cessation of fuel flow will stop the engine and prevent the water from entering the engine before it can cause damage to the internal parts of the engine.

Other objects and many of the attendant advantages of this invention will be readily appreciated as the same becomes better understood by reference to the following detailed description when considered in connection with the accompanying drawing, in which:

FIGURE 1 is a diagrammatic view of one embodiment of the present invention installed in a vehicle engine fuel system;

FIGURE 2 is a sectional view in elevation of a water separator and fuel cutoff constructed in accordance with the present invention; and FIGURE 3 is a sectional view of the water separator of FIGURE 2 taken along the lines 3—3.

Referring now to FIGURE 1, whereon there is shown my improved water eliminator and fuel cutoff device 10 interposed between a conventional fuel tank 20 that is filled with fuel through filler neck 21, and a motor vehicle diesel powered engine 30 that receives metered fuel via a fuel pump 31 and fuel injector lines 32.

Turning now to FIGURES 2 and 3, my water separator and fuel cutoff 10 comprises a cylindrical chamber or casing 11 closed at one end by a removable bottom cap member 12 provided with a drain plug 13, and closed at the other end by a removable top cap member 14 through which contaminated fuel enters the chamber via inlet 15 and uncontaminated fuel leaves the chamber 11 via an outlet connection 16. A valve seat 17 is threadedly connected to the top cap member 14 upon which a ball float valve 18 is adapted to seat so as to form a closure for the outlet of the water separator 10. Surrounding the valve seat 17 is an upstanding cylindrical guide tube 19 that is provided with a plurality of openings 22. Openings 22 may be formed by any convenient method such as drilling, moulding, or the like. Guide tube 19 serves to guide the vertical movement of the ball float valve 18 and is installed within the chamber 11 through a bore 23 provided in bottom cap 12. Guide tube 19 is supported and maintained in position at its lower end by the inner face of a well forming nut 24 and the recess formed by the nut and bore 23, and at its top end by a shoulder 25 formed on valve seat 17.

Guide tube 19, valve seat 17 and ball valve 18 are preferably constructed of a plastic material such as for example, polyvinyl chloride, or other equivalent plastics that are relatively hard, easily workable and which are highly resistant to the corrosive effects of the liquids being separated. The casing, cap members and the other parts of the device are typically fabricated of a suitable metal, such as cast iron, brass, copper or alloys thereof.

In order to provide for the effects of thermal expansion and contraction of the various members, clearance is provided between the shoulder 25 of the valve seat 17 and the inner wall 26 of guide tube 19. Also, an expansion gap is provided between the top edge 27 of guide tube 19 and the inside surface 28 of top cap 14, when the separator is assembled. By providing these spaces, particularly the latter one, buckling of tube 19 will be prevented. This problem usually arises when the separator is located in the engine compartment or when it is mounted directly on the engine.

Ball valve 18 is designed to have a specific gravity that is intermediate the specific gravities of the liquids being separated. When my invention is used to separate water from fuel the specific gravity of ball valve 18 is greater than the specific gravity of the fuel and less than the specific gravity of water. Ball valve 18 will therefore be in equilibrium, or will float at the interface between the liquids being separated.

In the operation of the apparatus, fuel enters the device through inlet 15 and fills up the chamber 11. As long as there is no water present in the fuel, float valve 18 will remain in its lowermost position resting in the well 29 formed in nut 24 as shown in FIGURE 2 in phantom view. Float valve 18 will remain in this position as long as no water is brought in with the fuel. When water enters the chamber 11 with the fuel, it will separate from the fuel and go to the bottom of the chamber 11 because of its heavier specific gravity. As the water level $I_W$, which corresponds to the interface between the fuel and the water rises, ball float valve 18 will rise with it until the valve 18 reaches the valve seat 17 and cuts off the flow of fuel out of the chamber 11. With the separator 10 installed in the fuel system depicted in FIGURE 1, the shutting off of the fuel will stop engine 30 before the water accumulated in the separator 10 can be brought into the fuel pump 31 and then be injected into engine 30.

Ball float valve 18 should be designed with a buoyancy such that when it is in equilibrium at the interface $I_W$, it will float almost completely on top of the surface of the water. This is to insure that the float valve 18 will be firmly seated on valve seat 17 before the level of the water is able to rise to that point.

Once the engine has been shut down, the drain plug 13 can be removed and the water in the chamber 11 can be drained out.

Although the float valve 18 is shown to have a spherical shape, other convenient shapes may be equally employed. Further, for ease of manufacture and assembly, chamber 11, guide tube 19, valve seat 17, and ball valve 18 are all shown to be concentric about the center line or axis A—A of the chamber.

While my water separator and fuel cutoff invention has particular advantages as a separate unit in an automotive engine fuel system such as illustrated in FIGURE 1, the novel combination of the guide tube 19, the direct acting ball float valve 18, and the valve seat 17 can be utilized to great advantage when installed in the fuel tank 20. Additionally, in the case of a gasoline operated engine, these elements are well adapted to be installed in their cooperative relationship in the carburetor associated with the engine.

Various modifications are contemplated and may obviously be resorted to by those skilled in the art without departing from the spirit and scope of the invention, as hereinafter defined by the appended claims, as only a preferred embodiment thereof has been disclosed.

What I claim is:

1. An apparatus for separating a liquid of a lighter specific gravity from a liquid of a heavier specific gravity in a mixture of such liquids, the apparatus comprising,
   a body including,
   an inlet port for the mixed liquids,
   a chamber in fluid communication with said inlet port in which the mixture of liquids may separate into an upper layer composed of the liquid of the lighter specific gravity and a lower layer composed of the liquid of heavier specific gravity, with the layers defining an interface between the layers,
   an outlet port communicating with said chamber at an upper end thereof;
   a spherical float positioned within said chamber, said float having a specific gravity intermediate that of the two liquids to float on the interface between the layers, said float rising in the chamber as the level of the heavier liquid rises,
   a vertically-extending guide tube positioned within said chamber about said outlet port loosely receiving said float, said inlet port being positioned radially outwardly of said guide tube, said guide tube guiding said float during vertical motion thereof into blocking contact with said outlet port to prevent the heavier liquid passing through said outlet port, said guide tube having,
   an impervious solid cylindrical wall, and
   a few, relatively small, spaced openings in said wall to permit passage of fluid between said inlet and outlet ports, whereby under externally applied vibration said wall stabilizes the liquid within said chamber against sloshing motion to maintain the liquids in separated condition.

2. An apparatus for separating a liquid of a lighter specific gravity from a liquid of a heavier specific gravity in an immiscible mixture of such liquids, the apparatus comprising,
   a body having,
   an inlet port for the mixed liquids,
   a chamber in fluid communication with said inlet port in which the mixture of liquids may separate into an upper layer composed of the liquid having the lighter specific gravity and a lower layer comprised of the liquid of heavier specific gravity with the layers defining an interface between the layers,
   an outlet port in fluid communication with said chamber at an upper end thereof;
   a spherical float disposed in said chamber, said float having a specific gravity intermediate that of the liquids to float on the interface between the layers, said float rising in the chamber as the level of the heavier liquid rises,
   a vertically extending guide tube positioned within said chamber about said outlet port, loosely receiving said float, said guide tube guiding said float during vertical motion thereof into blocking contact with said outlet port to prevent the heavier liquid passing through said outlet port,
   a selectively openable drainage port aligned vertically with said outlet port at the lower end of said chamber, said guide tube guiding said float during downward motion into blocking contact with said drainage port to prevent the lighter liquid passing out of said drainage port,
   said outlet and drainage ports being provided with concave, recessed, approach portions shaped generally as a portion of a sphere and positioned to be sealingly contacted by said float upon extreme upward and downward movement thereof.

3. An apparatus for separating a liquid of a lighter specific gravity from a liquid of a heavier specific gravity in a mixture of such liquids, the apparatus comprising,
a body including,
an inlet port for the mixed liquids,
a chamber in fluid communication with said inlet port in which the mixture of liquid may separate into an upper layer composed of the liquid having the lighter specific gravity and a lower layer composed of the liquid of heavier specific gravity with the layers defining an interface between the layers,
an outlet port communicating with said chamber at an upper end thereof;
a spherical float in said chamber, said float having a specific gravity intermediate that of the liquids to float on the interface between the layers, said float rising in the chamber as the level of the heavier liquid rises,
a vertically-extending guide tube positioned within said chamber about said outlet port loosely receiving said float, said guide tube guiding said float during vertical motion thereof into blocking contact with said outlet port to prevent the heavier liquid passing through said outlet port,
said body further including,
a downwardly projecting boss at the upper end of said chamber extending about said outlet port into the upper end of said guide tube, said boss and said guide tube being radially spaced a sufficient distance to permit differential thermal expansion without interference between said guide tube and said boss,
an annular recess at the lower end of said chamber loosely receiving the lower end of said guide tube, said recess being of sufficient radial extent to permit differential thermal expansion between said guide tube and the adjacent lower end portions of said guide tube without radial interference, said guide tube being of less vertical extent than the vertical extent of said chamber, fitting loosely therein to permit differential thermal expansion in a direction axially of said chamber without interference between said guide tube and said body.

References Cited

UNITED STATES PATENTS

| | | | |
|---|---|---|---|
| 1,519,479 | 12/1924 | Bennefeld | 210—114 |
| 1,711,428 | 4/1929 | Schafer | 210—115 |
| 2,047,229 | 7/1936 | Samiran | 210—115 X |
| 2,533,395 | 12/1950 | Paine | 210—119 X |

REUBEN FRIEDMAN, *Primary Examiner.*

J. ADEE, *Assistant Examiner.*